US011138410B1

(12) United States Patent
Torrione et al.

(10) Patent No.: US 11,138,410 B1
(45) Date of Patent: Oct. 5, 2021

(54) 3-D OBJECT DETECTION AND CLASSIFICATION FROM IMAGERY

(71) Applicant: COVAR APPLIED TECHNOLOGIES, INC., McLean, VA (US)

(72) Inventors: Peter A. Torrione, Durham, NC (US); Mark Hibbard, McLean, VA (US)

(73) Assignee: Covar Applied Technologies, Inc., McLean, VA (US)

( * ) Notice: Subject to any disclaimer, the term of this patent is extended or adjusted under 35 U.S.C. 154(b) by 0 days.

(21) Appl. No.: 17/001,779

(22) Filed: Aug. 25, 2020

(51) Int. Cl.
*G06K 9/00* (2006.01)
*G06T 7/11* (2017.01)
*G06K 9/62* (2006.01)
*G06T 7/70* (2017.01)
*G06N 3/08* (2006.01)

(52) U.S. Cl.
CPC ....... *G06K 9/00214* (2013.01); *G06K 9/6201* (2013.01); *G06T 7/11* (2017.01); *G06T 7/70* (2017.01); *G06N 3/08* (2013.01); *G06T 2207/20084* (2013.01)

(58) Field of Classification Search
CPC .......................................... G06T 2207/20084
See application file for complete search history.

(56) References Cited

U.S. PATENT DOCUMENTS

| | | | | |
|---|---|---|---|---|
| 8,270,770 B1* | 9/2012 | Jin | ........................... | G06T 7/11 382/294 |
| 2008/0292194 A1* | 11/2008 | Schmidt | ................... | G06T 7/11 382/217 |
| 2009/0028403 A1* | 1/2009 | Bar-Aviv | ................. | G06K 9/46 382/128 |
| 2009/0322860 A1* | 12/2009 | Zhang | .................. | H04N 13/261 348/46 |
| 2010/0104199 A1* | 4/2010 | Zhang | .................... | G08G 1/165 382/199 |
| 2010/0111370 A1* | 5/2010 | Black | ................. | G06K 9/00369 382/111 |
| 2010/0173269 A1* | 7/2010 | Puri | .................... | G09B 19/0092 434/127 |
| 2010/0329568 A1* | 12/2010 | Gamliel | ............ | G06K 9/00281 382/190 |
| 2011/0043540 A1* | 2/2011 | Fancher | .................... | G06T 7/50 345/672 |
| 2014/0198979 A1* | 7/2014 | Hamarneh | ................ | G06T 7/11 382/154 |
| 2015/0242697 A1* | 8/2015 | Guo | ...................... | G06T 7/0012 382/128 |
| 2016/0267340 A1* | 9/2016 | Jensen | ............... | G06K 9/00885 |

(Continued)

*Primary Examiner* — Hadi Akhavannik
(74) *Attorney, Agent, or Firm* — Gregory L. Porter; Hunton Andrews Kurth LLP

(57) ABSTRACT

A system and method for recognizing objects in an image is described. The system can receive an image from a sensor and detect one or more objects in the image. The system can further detect one or more components of each detected object. Subsequently, the system can create a segmentation map based on the components detected for each detected object and determine whether the segmentation map matches a plurality of 3-D models (or projections thereof). Additionally, the system can display a notification through a user interface indicating whether the segmentation map matches at least one of the plurality of 3-D models.

20 Claims, 8 Drawing Sheets

(56) References Cited

U.S. PATENT DOCUMENTS

| | | | |
|---|---|---|---|
| 2016/0267656 A1* | 9/2016 | Van Leeuwen | G06T 7/0014 |
| 2018/0260793 A1* | 9/2018 | Li | G06N 7/005 |
| 2019/0043203 A1* | 2/2019 | Fleishman | G06N 3/04 |
| 2019/0147221 A1* | 5/2019 | Grabner | G06T 7/75 |
| | | | 382/103 |
| 2020/0193591 A1* | 6/2020 | Kamiyama | G06T 7/0012 |

* cited by examiner

3-D OBJECT DETECTION AND CLASSIFICATION FROM IMAGERY

FIELD OF THE INVENTION

The present invention pertains to object detection and processing.

BACKGROUND AND SUMMARY

Object detection is a computer technology related to computer vision and image processing that deals with detecting instances of objects of a certain class (e.g., humans, buildings, or cars) in digital images and videos. Methods for object detection generally fall into either classical machine learning-based approaches or deep learning-based approaches. For Classical Machine Learning approaches, it becomes necessary to first define features, then using a technique such as support vector machine (SVM) to do the classification.

3D object recognition involves recognizing and determining 3D information, such as the pose, volume, or shape, of user-chosen 3D objects in a photograph or range scan. Typically, an example of the object to be recognized is presented to a vision system in a controlled environment, and then for an arbitrary input such as a video stream, the system locates the previously presented object. This can be done either off-line, or in real-time. The algorithms for solving this problem are specialized for locating a single pre-identified object.

Some target recognition techniques such as 3-dimmensional automatic or aided target recognition techniques, use passive 2-dimensional sensing modalities (e.g., Visible, MWIR). These target recognition models work optimally when they receive certain data about the object they intent to detect. Additionally, the output from these models is usually limited to a box drawn around the detected object. As such, these models do not provide any information about how or why the detected object was recognized or classified.

In some applications, e.g., military applications, it is very important for the model to make accurate predictions with limited training data. In fact, oftentimes, there is no data available for these objects. This lack of data impedes the training process for the model, and thus, reduces the accuracy of the model's predictions. Furthermore, in these applications, due to the serious consequences that can come about as a result of the prediction, the end-user must be able to immediately interpret and/or verify the system's output, e.g., the end-user must be able to understand how and why the system came up with its conclusion.

It is an object of this disclosure to describe a target recognition model and system which can accurately detect targets when no data from those targets can be collected. Additionally, it is an object of this disclosure to provide for a target recognition model and system which can enable a user to evaluate and analyze the model's output after the model makes one or more predictions.

Accordingly, a system and method for recognizing objects in an image is described. The system can receive an image from a sensor and detect one or more objects in the image. The system can further detect one or more components of each detected object. Subsequently, the system can create a segmentation map based on the components detected for each detected object and determine whether the segmentation map matches one or more predetermined projections generated based on 3-D models. Additionally, the system can display a notification through a user interface indicating whether the segmentation map matches at least one of the plurality of predetermined projections.

In contrast to standard end-to-end deep learning networks, the proposed invention separates the target detection and classification process into a multi-stage process. The target recognition model disclosed herein can offer a new approach to computer aided object detection and classification. This model can leverage generic, robust background information (e.g., what wheels look like in a vehicle) and known component relationships (i.e., the size and shape of components on the vehicle) to perform reliable, explainable target detection and classification. This model can solve the robustness problem by training a multi-task, multi-purpose data processing backbone which enables robust object detection and component part segmentation. The outputs of this part segmentation network can be then integrated into a component-based target identifier that can be updated using only physical models of new target classes, or 3-D models (e.g., CAD Models). This enables the model to detect new types of objects without requiring any sensor data for these new classes.

The target recognition technique of the present disclosure is more precise than other target recognition techniques. One of the reasons for this precision is that this technique uses various steps which optimize the target recognition process. For example, many target recognition techniques attempt to directly classify an object. However, in one embodiment, the present disclosure provides for detecting an entity of interest (or broad object class) first, which is much easier and precise than classification of objects. Similarly, the present disclosure provides for segmentation of parts of a detected object (or target), which is also much easier than classification of objects. As such, the final classification of the object based on the segmented parts is easier and more accurate.

BRIEF DESCRIPTION OF THE DRAWINGS

In order to facilitate a fuller understanding of the present invention, reference is now made to the attached drawings. The drawings should not be construed as limiting the recent invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Receiving an Image from a Sensor

In one example embodiment, a target detection technique can include a step for receiving an image or sequence of images from a sensor. The sensor can be an image sensor or imager which can detect and convey information about one or more objects. In one example embodiment, an image module of the sensor can convert the variable attenuation of light waves (as they pass through or reflect off objects) into signals and generate images based on the signals. The waves can be light or other electromagnetic radiation. In one example embodiment, the sensor can be an analog camera, digital camera, camera module, or even night vision equipment such as infrared imaging, thermal imaging device, radar, sonar, or other devices.

In one example embodiment, the image can be a visible image, e.g., a photo, or an infrared image. In one example embodiment, the sensor can be a radar or a synthetic-aperture radar which captures two-dimensional or three-dimensional images of objects. In one example embodiment, an image can be generated using hyperspectral imaging. In one example embodiment, the image can be a three-dimensional data cube. In one example embodiment, the image can be a LIDAR range map. In other examples, the image can be a combination of one or more images of different types.

In one example embodiment, the sensor can capture a sequence of images. For example, if a vehicle is moving, the sensor can capture several images of the vehicle in a sequence. In contrast to a single image, which includes only a single articulation of the vehicle, the sequence of images include multiple articulations of the vehicle, which can generate a kinematic model for the vehicle and reduce uncertainty for a target detection technique.

Figure 1:
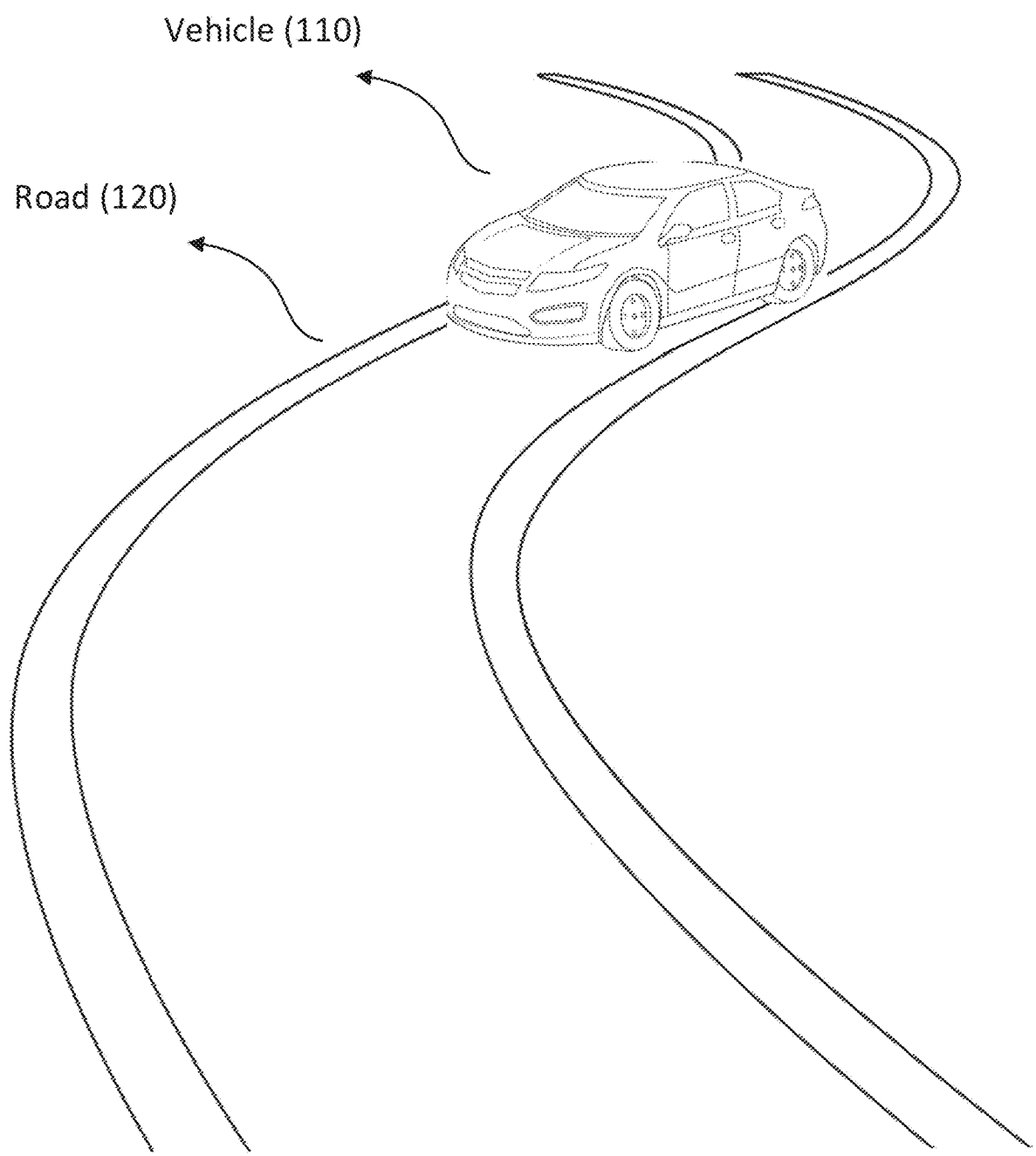
FIG. 1 shows an image provided to a target detection system according to an example embodiment.

FIG. 1 shows an image 100 provided to a target detection system according to an example embodiment. In this example embodiment, the image 100 is a photo and displays a vehicle 110 driving on a road 120. This image was captured using a digital camera.

Entity of Interest Detection

In an example embodiment, the target recognition technique can include a step for detecting an entity of interest (or object) in an image. In this step, one or more detectors can be trained to detect objects that fit into one or more broad classes of objects. Each detector can be a module stored and executed on the target recognition system described herein. For example, a detector can be trained to detect the vehicle 100 and determine whether the vehicle 100 fits into one or more classes including ground vehicles, persons, SAM batteries or aircrafts. In the example embodiment of FIG. 1, the detector can detect the vehicle 100 and determine that the vehicle 100 fits into the class of ground vehicles. Accordingly, the vehicle 100 can be an entity of interest.

In one example embodiment, there can be several benefits to detecting the objects of interest before segmenting the objects in an image. For example, for a large image including a plurality of objects, it can be inefficient to perform segmentation on every object included in the image, particularly when the user is not interested in all the objects displayed in the image. Thus, performing the segmentation before detection of the objects (or instead of detection) may be a waste of resources. However, in another example embodiment, an application of the target recognition technique may require performing the segmentation before the detection (or instead of the detection). In any event, in one example embodiment, the detection step can be completely separate and independent from the segmentation step.

In one example embodiment, in order to perform the detection step, a system implementing the target recognition technique can use one or more object identification deep learning architectures and algorithms, e.g., YOLO, CenterNet, Mask-RCNN, Detectron, etc. In one example embodiment, the system implementing the target recognition technique can use algorithms and techniques such as HOG+SVM, hot-spot detectors, motion based classifiers, bag of words, etc., for detecting the objects of interest in the image.

In one example embodiment, a detector can operate without any training, but in another example, a detector can require machine learning training. In one example embodiment, a detector trained to detect entities of interest can be trained on less data than end-to-end classification networks, and thus, can be more responsive to dynamic scenarios, varying backgrounds, occlusions, and uncooperative targets. In some embodiments, algorithms employ a database of images from the sensor modality of interest, together with labeled instances (e.g., boxes or other shapes) representing the locations of the objects of interest in these images. Algorithms may be trained using itterative techniques, non-iterative techniques or a combination thereof. Optimization processes or routines may be employed such as gradient descent, stochastic gradient descent or other methodologies.

Figure 2:
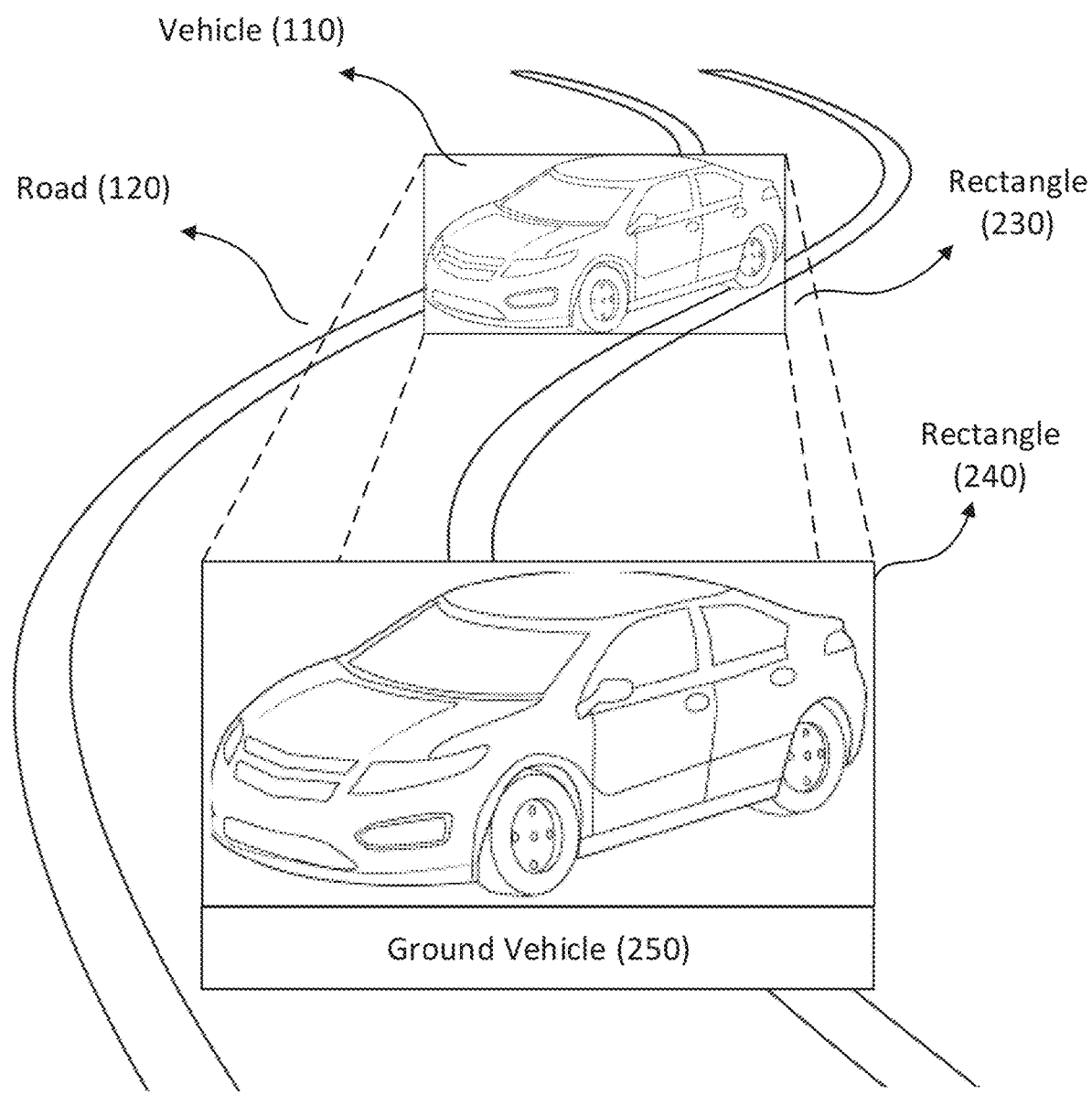
FIG. 2 shows the image after the system detects a vehicle.

FIG. 2 shows the image 100 after the system detects the vehicle 110. In this example embodiment, after detecting the vehicle 100 as an object of interest, the system can determine that the vehicle 100 belongs to the class of ground vehicles For example, the system can be configured to draw a rectangle 230 around the vehicle 110 and zoom in on the vehicle 110 (as shown by a rectangle 240). The system can also display the rectangle 230 and/or the rectangle 240 in a user interface for an end-user to see, analyze and evaluate. The user interface can also display a label 250 explaining the broad category of objects to which the entity of interest belongs, e.g., ground vehicles. In one example embodiment, the system does not draw or display any rectangle around the detected object. In one example embodiment, a user-interface module can be responsible for determining what information and how it is displayed on the user interface.

In one example embodiment, a detector module can pass information relating to the detected object to a module configured to perform segmentation and/or identification. This information can include, e.g., pixel coordinates for the detected object.

Generation of the Database of 3-D Models and Projections Thereof

In one example embodiment, the target recognition technique of the present disclosure can include a database of 3-D models. A 3-D model can contain information about the relative size and placement of the components of an entity of interest (or object). For example, a 3-D model for Model X of Vehicle A can include information about the relative size and placement of the wheels, windows, headlights, body, etc. In one example embodiment, a 3-D model can include details about connections, articulations, and inter-relations of the components of an object. Each 3-D model can be associated with a set of information and data points about an underlying object, e.g., car, tank, etc. If a target image is matched with a 3-D model, the system can associate the set of information and data points with the target image, e.g., name of the car, model, year, weight, etc.

A 3-D model can be used to depict the object in various angles, orientations, renditions, distances and views. For example, a 3-D model of a car may have sufficient information about the visual representation of the car in different angles, views and distances, e.g., top, bottom and sides from 1000 feet away when the windows are open and/or closed. Accordingly, in one example, the 3-D model can be used to show the car from top, bottom, sides and perspective angles. Each instance of representation of the car based on the 3-D model is a projection of the 3-D model in a target manifestation. Each projection can be associated with a set of information and data points which represent the 3-D model (and the object associated with it) as well as the angle, orientation, rendition, distance and view of the underlying object depicted by the projection. As such, if a projection is matched with a target image, the system can associate with the image, the 3-D model (and the object associated with it) as well as the angle, orientation, rendition, distance and view of the underlying object depicted by the projection, e.g., a Model X of Vehicle A depicted from the side.

In one example embodiment, the database can include a plurality of projections based on 3-D models for different objects and object types. These projections can be synthetically projected or superimposed into an image received from a camera. These synthetic projections or superimpositions can make a database of numerous ways in which an entity of interest (or object) can manifest itself in an image.

Figure 3:
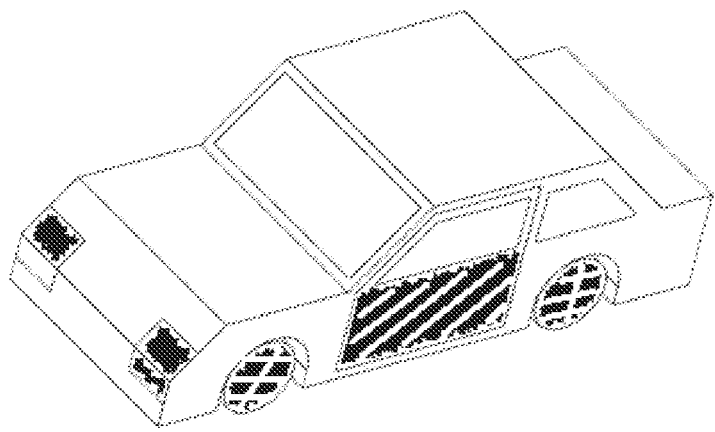
FIG. 3 shows an example CAD target model and various image projections generated from the target model.
Figure 3:
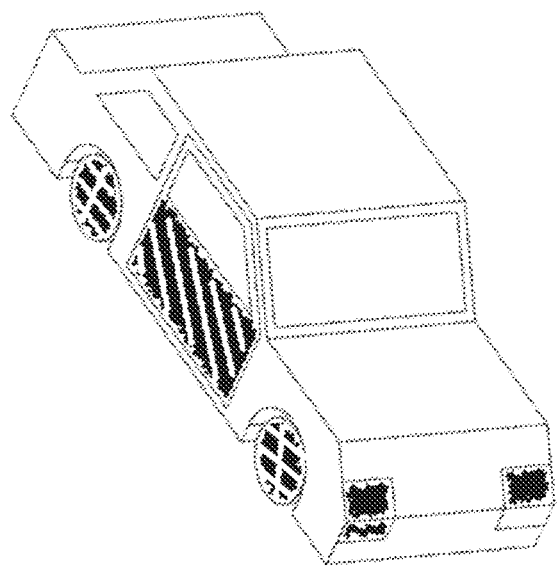

In one example embodiment, a projection of the 3-D model may include information regarding Model X of Vehicle A. The database can include various samplings or projections of the 3-D model, e.g., 50 in target orientation, 50 in target pitch, and varying the dominant articulations (e.g., turret vs. hull heading) in 50 increments. In this example embodiment, in addition to Model X of Vehicle A, the database can include 3-D models and projections for other objects belonging to the same class, e.g., other vehicles belonging to the class of passenger vehicles such as Model Y of Vehicle B. The database can also include the 3-D models and projections for objects belonging to other classes, e.g., vehicles belonging to other classes such as busses. As another example, the database may even include 3-D models and projections for other objects, e.g., airplanes. FIG. 3 shows an example 3-D model and various projections generated based on the 3-D models.

In one example embodiment, prior to deployment of the system of the present disclosure, a database of projections based on 3-D models of target classes and/or entities of interest can be generated or stored. In another example embodiment, the database of projections based on 3-D models of target classes of interest can be generated or stored during or after the system deployment.

Segmentation of an Image

In one example embodiment, the target recognition technique can include a step for segmenting a detected entity of interest (or object). The system implementing the target recognition technique can include a segmentation module for identifying various components of an entity of interest (or object). For example, for a detected vehicle, the segmentation module can identify the wheels, doors and headlights of the vehicle. The segmentation module can receive the image including the detected object and/or information relating to the detected object from a detector module. Once the segmentation module identifies the components of the detected object, segmentation module can generate a segmentation map.

In one example embodiment, in order to perform the segmentation step, a system implementing the target recognition technique can use one or more of the following algorithms and/or techniques: U-Net, CenterNet, Conditional Random Fields (CRF), R-CNN, DeepLab, and/or RNM. In one example embodiment, the one or more algorithms can be trained to identify components or parts of the detected objects. For example, for a vehicle, the algorithms can be trained to identify doors, headlights, wheels, etc. The training can involve feeding many images of these components to the algorithms. The training of this network does not need to include examples of the target classes that are going to be detected by the system; the training of this network may only require that the components (e.g., wheels) of the vehicles to be classified are represented in the training set.

Figure 4:
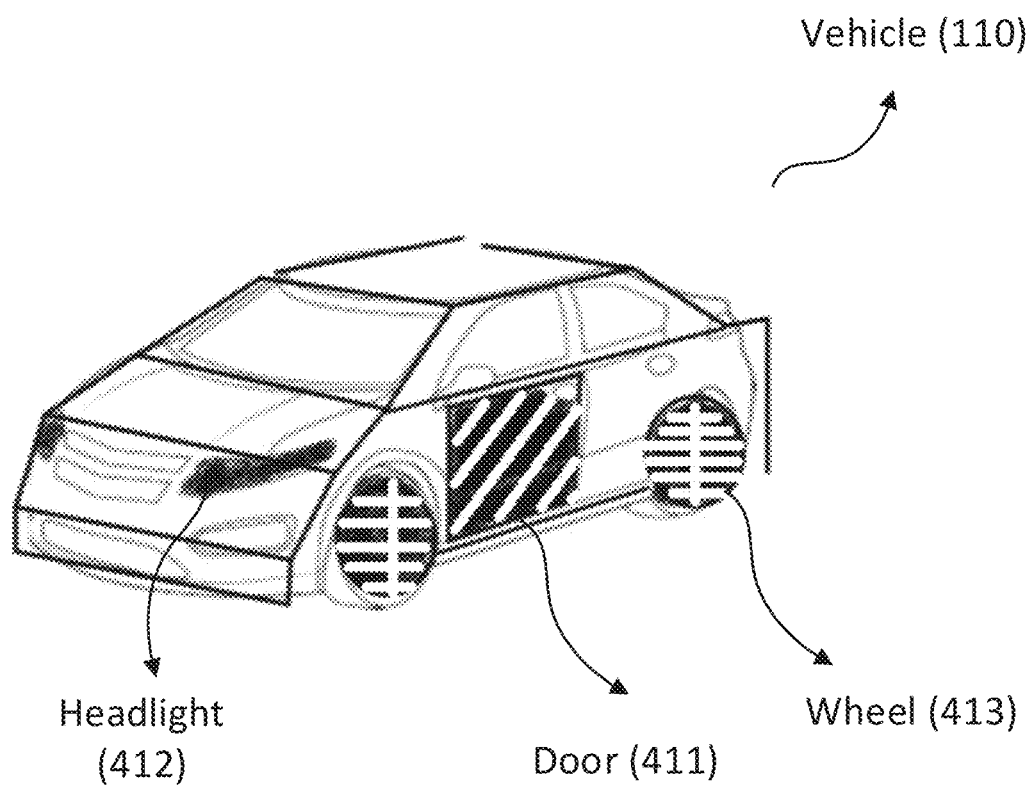
FIG. 4 shows a visual representation of a detected object after segmentation.

FIG. 4 shows a visual representation of a detected object after segmentation. In this example embodiment, the detected object is a vehicle 110. The segmentation module can identify a door 411, headlights 412 and wheels 413. The system can display a visual representation or segmentation map of the identified components, i.e., the door 411, headlights 412 and wheels 413 in the user interface. The visual representation or segmentation map of these components can enable the user to understand why the system makes a prediction about a detected object. For example, if ultimately the system identifies a detected object as a tank, the user can visually see that the vehicle was identified as such because, e.g., it has a barrel.

In one example embodiment, the target recognition technique can include a step for segmenting any entity of interest (or object). In other words, the segmentation step of the present disclosure may not be limited to the detected entity of interest.

Classifying the Detected Object

In one example embodiment, the target recognition technique can include a step for classifying the detected entity of interest (or object). The system implementing the target recognition technique can include a classification module which can use the segmentation map to classify the detected object. In one example embodiment, once the segmentation is complete (i.e., the components of the detect object are identified), the resulting segmentation map can be compared to the database of projections (generated based on various 3-D models) to identify the most likely target that could have generated the observed segmentation map. For example, if the pixels associated with the components of the detected object (as identified in the segmentation map) match or overlap the hypothesized pixels of the projection, then one can infer that the projection matches the segmentation map. In one example embodiment, an exact match is not required and a rough match (e.g., within a threshold range) would suffice.

The classification model can be implemented using either deep classification networks trained from the projections, classical machine learning (e.g., SVM, Random Forests) which are iterative training processes or via direct probabilistic 3-D model matching (non-iterative training process) with segmentation maps. Training may be employed as necessary or desired.

In one example embodiment, the classification module can output a probabilistic measure of the likelihood that the detected object matches a projection, and thus, a 3-D model. In this example embodiment, the objective is to maximize the probabilistic measure for matching the segmentation map to the projections provided in the database. With this information, the classification module can identify an object associated with the 3-D model, e.g., Model X of Vehicle A, as the object depicted in the segmentation map. Also, in one example embodiment, the projection is a specific manifestation and/or rendition of the 3-D model at a specific position, orientation, and articulation. Therefore, the particular projection matched can indicate the hypothesized target position, orientation, and articulation. In one example embodiment, based on the matched projection, the system can determine various details about the detected object, e.g., whether the windows of a vehicle are down; whether the barrel of a tank is pointing at the user; etc. In one example embodiment, based on the specific position, orientation, and/or articulation of the detected object, the system may further classify the detected object. For example, the system may further classify a tank as a threat if the barrel is pointed at the camera or moving in the direction of the camera. In one example embodiment, based on the specific position, orientation, and apparent image size (in pixels), the system may estimate the object distance to the camera.

In one example embodiment, the system can take the projections stored in the database and, generate various segmentation maps. Using a trained deep learning network, the system can match the detected segmentation map to the projections stored in the database.

Figure 5:
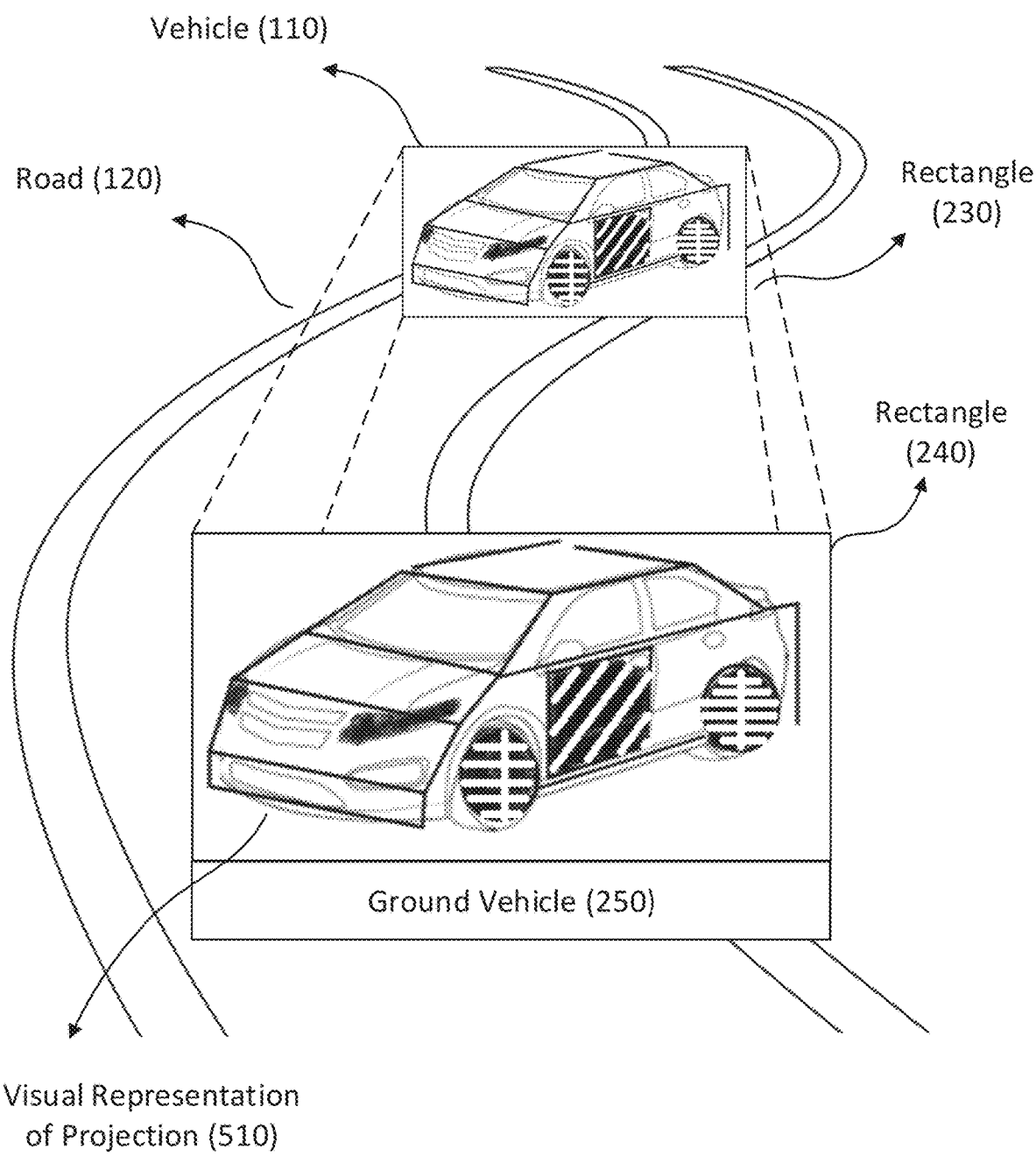
FIG. 5 shows the image on which a visual representation of a CAD model for the vehicle is displayed.

In one example embodiment, a user interface module can overlay a visual representation of the projection on the detected object. FIG. 5 shows the image 100 on which a visual representation of a projection for the vehicle 100 is displayed. In this example embodiment, the visual representation of the projection 510 matches the segmentation map of the vehicle 110. For example, the visual representation can match the components of the segmentation map with those of the projection, e.g., wheels, body, etc. This visual representation assists the user in understanding how the target recognition system classified the vehicle 100 as Model X of Vehicle A. For example, in this embodiment, the classification model matched the wheels, front door and the headlight of the vehicle 100 (i.e., segmentation map) to the projection for Model X of Vehicle A. The visual representation of the projection enables the user to quickly judge whether the system made an accurate prediction.

One of the benefits of the system described in this disclosure is that it is extendible to new target objects. Specifically, because only a 3-D model of the target object is required, no new data is required to train new object classification models for new types of vehicles, as long as those vehicles are composed of substantially the same or similar parts as other vehicles known to the segmentation network, and the CAD models are available.

The techniques and systems described in this disclosure successfully identify consistent rigid objects consisting of multiple differentiable components (which may or may not have different articulations). Examples of these objects include vehicles, aircraft, watercraft, spacecraft, satellites, weapons, computer systems, industrial machines and tools, etc. Another example may include antique cars for which there does not exist a lot of images to train machine learning models. However, one of ordinary skill in the art recognizes that these systems and techniques are not limited to detection and classification of these items, and in fact, these systems and techniques can detect and classify other objects.

Classification with Occlusions

In one example embodiment, the target recognition technique of the present disclosure can provide for classification of objects even if there is an occlusion. Most machine learning and deep learning approaches to target classification cannot properly identify targets when part of the target is significantly occluded. However, in the presented approach, the segmentation network may be trained to explicitly identify occluding objects (e.g., foliage, light poles, power lines, etc.).

If these segmentation maps include classes (e.g., foliage, light poles, power lines) that are known to not be part of any vehicle 3-D model, these regions, e.g., pixels, in the segmentation map can be easily excluded from the classification network or probabilistic model matching calculations. This stands in contrast to normal machine learning approaches which have no way to disambiguate the image pixels containing the occluding vs. component parts.

Example Embodiment

Figure 6:
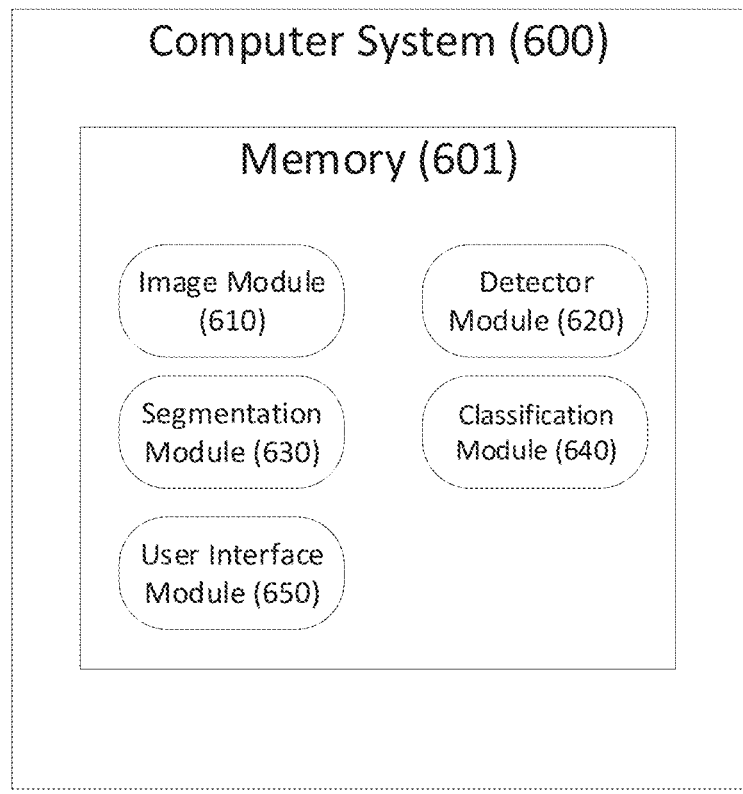
FIG. 6 shows an example system implementing the target recognition technique of the present disclosure.

FIG. 6 shows an example system 600 implementing the target recognition technique of the present disclosure. In this example embodiment, the system can include a memory 601 storing an image module 610, a detector module 620, a segmentation module 630, a classification module 640, and a user-interface module 650. In this example embodiment, the image module 610 can generate an image and provide the image to the detector module 620. The detector module 620 can detect an entity of interest in the image and pass information about the entity of interest to the segmentation module 630. The segmentation module 630 can detect one or more components of the entity of interest and prepare a segmentation map based on the components detected. The segmentation module 630 can transmit the segmentation map to the classification module 640, which can compare the segmentation map to the projections stored in a database. The classification module 640 can also match a projection to the segmentation map, and based on this matching, identify the entity of interest.

Figure 7:
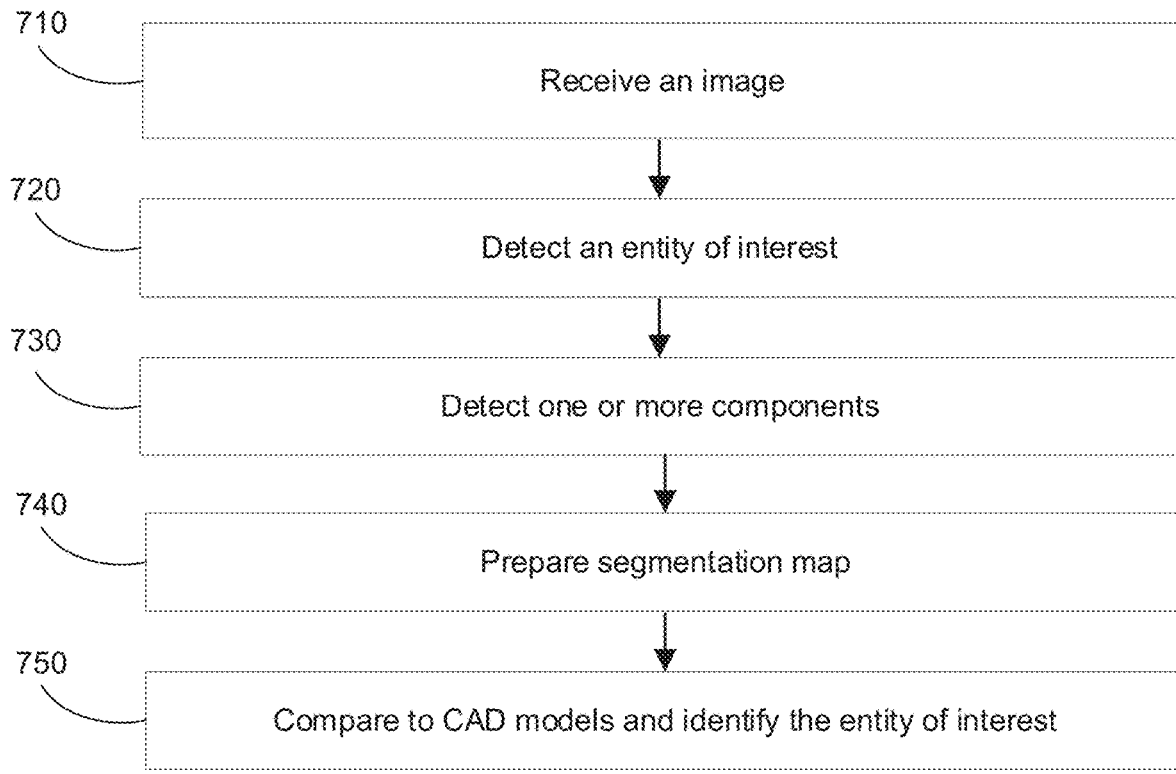
FIG. 7 shows an example flow chart for the target recognition technique of the present disclosure.

FIG. 7 shows an example flow chart 700 for the target recognition technique of the present disclosure. In this example embodiment, in step 710, the system can generate an image. In step 720, the system can detect an entity of interest in the image. In step 730, the system can detect one or more components of the entity of interest. In step 740, the system can prepare a segmentation map based on the components detected. In step 750, the system can compare the segmentation map to the projections stored in a database and identify the entity of interest. One of ordinary skill in the art recognizes that steps 730 and 740 can be combined in an example embodiment.

Technical Implementation of the System

Figure 8:
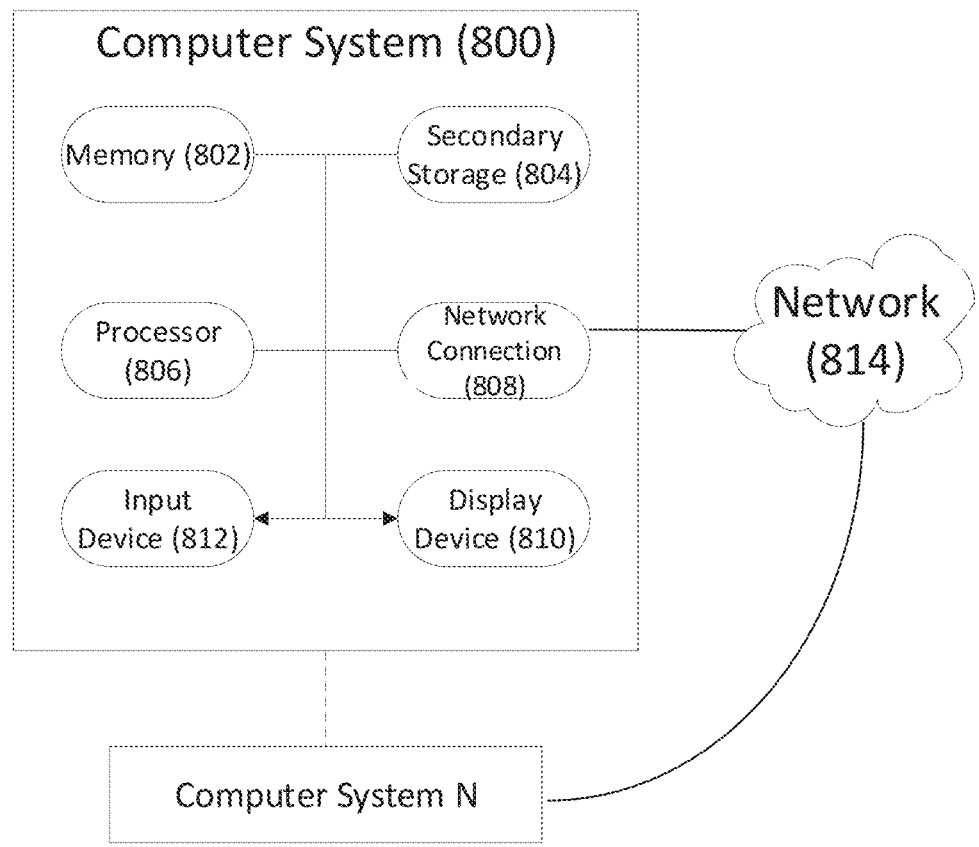
FIG. 8 shows exemplary hardware components of this system.

FIG. 8 illustrates exemplary hardware components of the system described herein. A computer system 800, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 800, may run an application (or software) and perform the steps and functionalities described above. Computer system 800 may connect to a network 814, e.g., Internet, or other network, to receive inquiries, obtain data, and transmit information and incentives as described above.

The computer system 800 typically includes a memory 802, a secondary storage device 804, and a processor 806. The computer system 800 may also include a plurality of processors 806 and be configured as a plurality of, e.g., blade servers, or other known server configurations. The computer system 800 may also include a network connection device 808, a display device 810, and an input device 812.

The memory 802 may include RAM or similar types of memory, and it may store one or more applications for execution by processor 806. Secondary storage device 804 may include a hard disk drive, floppy disk drive, CD-ROM drive, or other types of non-volatile data storage. Processor 806 executes the application(s), such as those described herein, which are stored in memory 802 or secondary storage 804, or received from the Internet or other network 814. The processing by processor 806 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 800 may store one or more database structures in the secondary storage 804, for example, for storing and maintaining the information necessary to perform the above-described functions. Alternatively, such information may be in storage devices separate from these components.

Also, as noted, processor 806 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 800.

The input device 812 may include any device for entering information into the computer system 800, such as a touch-screen, keyboard, mouse, cursor-control device, microphone, digital camera, video recorder or camcorder. The input and output device 812 may be used to enter information into GUIs during performance of the methods described above. The display device 810 may include any type of device for presenting visual information such as, for example, a computer monitor or flat-screen display (or mobile device screen). The display device 810 may display the GUIs and/or output from sub-system components (or software).

Examples of the computer system 800 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 800 is shown in detail, system 800 may use multiple computer systems or servers as necessary or desired to support the users and may also use back-up or redundant servers to prevent network downtime in the event of a failure of a particular server. In addition, although computer system 800 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 800, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method comprising:
   receiving an image from a sensor;
   detecting one or more objects in the image;
   detecting a plurality of components of each detected object;
   segmenting the plurality of components of each detected object;
   creating a segmentation map based on the plurality of components detected for each detected object, wherein:
      the segmentation map associates pixels in the image with each of the plurality of components; and
      the segmentation map is configured to be used to generate a visual representation of the plurality of components;
   determining whether the segmentation map matches at least one of a plurality of 3-D models; and
   displaying a notification through a user interface indicating whether the segmentation map matches the at least one of the plurality of 3-D models.

2. The method of claim 1, wherein the detecting the one or more objects in the image is performed using a YOLO algorithm, a CenterNet algorithm, Detectron, or a Mask-RCNN algorithm.

3. The method of claim 1, wherein the detecting the one or more objects in the image is performed using a HOG+SVM algorithm, a hot-spot detector, or a motion based detector.

4. The method of claim 1, wherein each 3-D model includes information about a relative size and placement of components of a target object.

5. The method of claim 1, further comprising generating projections based on the plurality of 3-D models by sampling each of the plurality of 3-D models in a plurality of target orientations, a plurality of target pitches, and/or varying dominant articulations in several increments.

6. The method of claim 1, wherein the determining whether the segmentation map matches the at least one of the plurality of 3-D models includes:
   projecting the plurality of 3-D models at arbitrary orientations, pitches, articulations into a simulated optical imaging system representative of the sensor to generate projections; and
   comparing the segmentation map to the projections.

7. The method of claim 1, wherein each of the plurality of 3-D models includes at least one projection.

8. The method of claim 1, wherein each of the plurality of 3-D models is a description of connections, articulations, and interactions between large-scale parts of an object.

9. The method of claim 1, wherein detecting the plurality of components of each detected object includes applying target component segmentation networks.

10. The method of claim 9, wherein the target component segmentation networks include U-Net, ResNet, or other modern image segmentation approaches.

11. The method of claim 1, wherein displaying a notification through a user interface includes a probabilistic measure of each detected object being a particular target class.

12. The method of claim 1, wherein displaying a notification through a user interface provides a hypothesized position, a hypothesized orientation, a hypothesized range, and a hypothesized articulation overlaid on a target object.

13. The method of claim 1, wherein the determining whether the segmentation map matches the at least one of the plurality of 3-D models includes using a deep network or a probabilistic matching technique.

14. A system comprising:
a processor, a memory and a display, wherein the processor is configured to:
receive an image from a sensor;
detect one or more objects in the image;
detect a plurality of components of each detected object;
create a segmentation map based on the plurality of components detected for each detected object, wherein:
the segmentation map associates pixels in the image with each of the plurality of components; and
the segmentation map is configured to be used to generate a visual representation of the plurality of components;
determine whether the segmentation map matches at least one of a plurality of 3-D models; and
displaying, using the display, a notification through a user interface indicating whether the segmentation map matches the at least one of the plurality of 3-D models.

15. The system of claim 14, wherein the processor detects the one or more objects in the image using a YOLO algorithm, a CenterNet algorithm, Detectron, or a Mask-RCNN algorithm.

16. The system of claim 14, wherein the processor detects the one or more objects in the image using a HOG+SVM algorithm, a hot-spot detector, or a motion based detector.

17. The system of claim 14, wherein each 3-D model includes information about a relative size and a placement of components of a target object.

18. The system of claim 14, wherein the processor is further configured to generate projections based on the plurality of 3-D models by sampling each of the plurality of 3-D models in a plurality of target orientations, a plurality of target pitches, and/or varying dominant articulations in several increments.

19. The system of claim 14, wherein the processor determine whether the segmentation map matches the at least one of the plurality of 3-D models by:
projecting the plurality of 3-D models at arbitrary orientations, pitches, articulations into a simulated optical imaging system representative of the sensor to generate projections; and
comparing the segmentation map to the projections.

20. A method comprising:
receiving an image from a sensor;
detecting one or more objects in the image;
detecting a plurality of components of each detected object;
determining whether a segmentation map matches at least one of a plurality of 3-D models, wherein:
the segmentation map associates pixels in the image with each of the plurality of components; and
the segmentation map is configured to be used to generate a visual representation of the plurality of components; and
displaying a notification through a user interface indicating whether the segmentation map matches the at least one of the plurality of 3-D models.

\* \* \* \* \*